United States Patent [19]

Cheung

[11] Patent Number: 5,456,529
[45] Date of Patent: Oct. 10, 1995

[54] POWERED OVERHEAD STOWAGE BIN

[75] Inventor: Kwun-Wing Cheung, Kent, Wash.

[73] Assignee: The Boeing Company, Seattle, Wash.

[21] Appl. No.: 176,400

[22] Filed: Dec. 30, 1993

[51] Int. Cl.$^6$ ...................................................... A47F 5/08
[52] U.S. Cl. ........................ 312/245; 312/325; 312/248; 312/319.6; 74/89.21
[58] Field of Search .............................. 312/24, 27, 242, 312/248, 319.2, 319.6, 325, 245; 74/89.21

[56] References Cited

U.S. PATENT DOCUMENTS

| | | | |
|---|---|---|---|
| 1,990,300 | 2/1935 | Miller . | |
| 2,100,928 | 11/1937 | Way | 312/242 |
| 2,860,873 | 11/1958 | Miles, Jr. | 74/89.21 |
| 3,028,209 | 4/1962 | Hinkel et al. . | |
| 3,729,245 | 4/1973 | Skifstrom . | |
| 3,814,492 | 6/1978 | Jacobs . | |
| 4,275,942 | 6/1981 | Steidl . | |
| 4,368,937 | 1/1983 | Palombo et al. | 312/325 |
| 4,729,490 | 3/1988 | Ziegenbein . | |
| 4,786,098 | 11/1988 | Jobmann et al. . | |
| 4,915,461 | 4/1990 | Kingsborough et al. . | |
| 5,096,271 | 3/1992 | Portman . | |
| 5,108,048 | 4/1992 | Chang . | |
| 5,129,597 | 7/1992 | Manthey et al. . | |
| 5,228,763 | 7/1993 | Gingold . | |
| 5,249,858 | 10/1993 | Nusser | 312/248 |

FOREIGN PATENT DOCUMENTS 4209037  9/1993  Germany .

*Primary Examiner*—Jose V. Chen
*Assistant Examiner*—Rodney B. White
*Attorney, Agent, or Firm*—Dellett and Walters

[57] ABSTRACT

An overhead stowage system for holding luggage above a passenger seat of an airplane has a holding bin movably coupled to a support structure of a modular design which may be preassembled prior assembly with the airplane. A motor drives a cable chain which is attached to the holding bin for moving the holding bin with respect to the structure. The motor is operatively coupled to a horizontal shaft which has a length corresponding to the length of the overhead stowage bin and which has an drive sprocket driving the cable chain as it is driven by the motor. A pulley disposed on the support structure redirects the force of the cable chain, as driven by the motor, for lifting the holding bin relative the support structure. The motor provides all or a partial force for lifting the holding bin. Switches and sensors located on the support structure and holding bin operate in accordance with the position of the holding bin relative the support structure for determining when and how the motor is to operate.

16 Claims, 5 Drawing Sheets

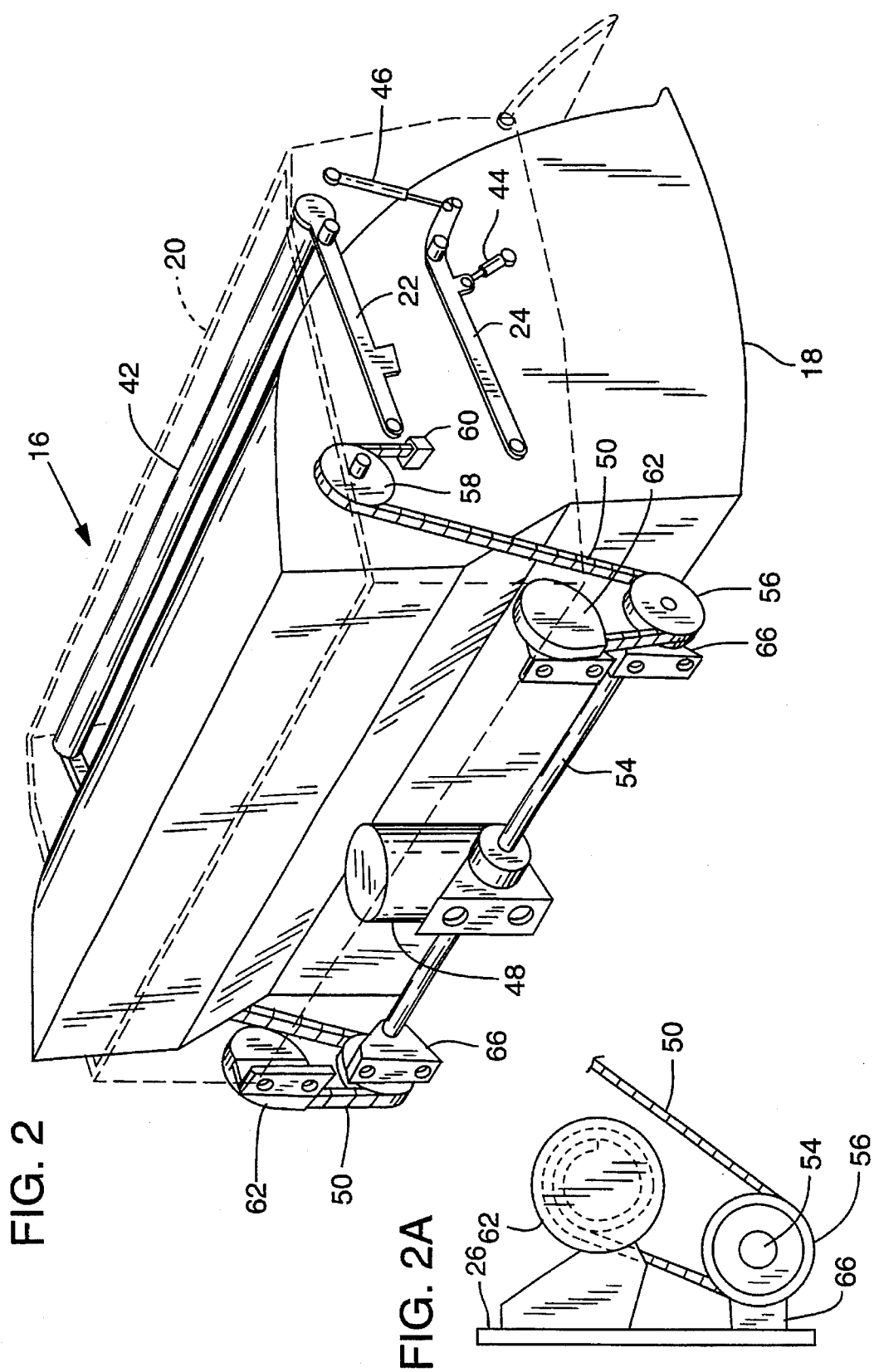

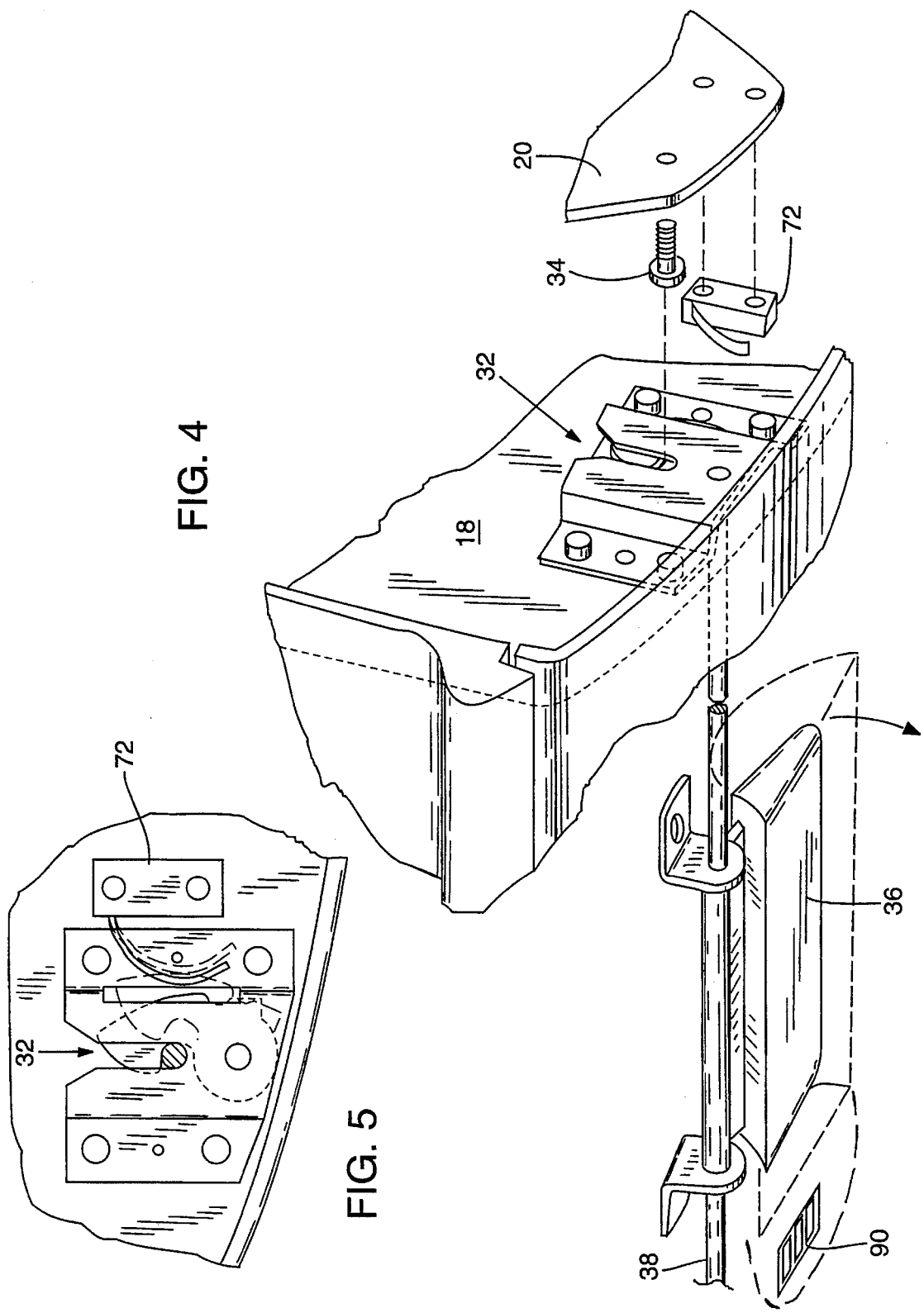

POWERED OVERHEAD STOWAGE BIN

BACKGROUND OF THE INVENTION

The present invention relates to an overhead stowage system for airplanes and particularly to such a system which is easier for flight personnel and passengers to operate.

Public transportation vehicles are typically provided with stowage facilities proximate passenger seats where passengers may stow personal luggage during travel. Airplanes, for example, have closable stowage bins located above the passenger seats for securing personal belongings even during turbulent travel conditions.

The center overhead stowage bins of an airplane are located with sufficient head room above the center row seats of the airplane so that when the bins are in their retracted position, passengers may access the seats therebelow. A movable holding bin of a center overhead stowage bin typically has a down, open position which is lower than the retracted, closed position in order to permit easy access during loading and unloading. After loading the bin, a passenger or flight attendant lifts the bin from its down, open position up to its retracted, closed position.

Center overhead stowage bins usually comprise a support structure fixed to the interior ceiling supports of the airplane's passenger compartment, the support structure consisting of a rectangular box frame. The holding bin which is tiltable fits within the open bottom of the support structure box frame, the bin being guided within the support structure by linkage arms. The linkage arms are pivotally mounted between the holding bin and the support structure and have different lengths so that, when the holding bin is moved downwardly with respect to the support structure, the bin tilts as it pivotally drops into its lower, open position. When the holding bin is returned to its retracted, closed position, a latch engages a protruding post on the support structure for securing the bin in its closed position.

Passive springs and snubbers may accompany the linkage arms to assist lifting and lowering the holding bin relative the support structure. Passive springs, e.g. hydraulic springs, operate between the support structure and the linkage arms whereby the holding bin receives an upward force for assisting an operator in moving the bin within its designated path. The snubbers are coupled between the linkage arms and the support structure. When the latch is released for lowering the holding bin, the snubbers limit how fast the holding bin falls into its lower, open position.

The above-described overhead stowage bins require an operator to provide manual force comparable to the luggage weight (minus the passive spring forces as delivered via the linkage arms) in order to push the loaded bin up from its open position to its closed position. Therefore, bin size has been kept small in order to limit the quantity of luggage the bin can hold and thus limit its load weight in accordance with the force considered appropriate for a passenger or flight attendant to exert. Even then, difficulty may be experienced by passengers in properly loading luggage. For instance, if a passive bin design provides 80 pounds of lifting force for lifting 20 pounds of luggage, then the passenger will likewise have to overcome the 80 pound lifting force in order to pull the bin down when empty.

SUMMARY OF THE INVENTION

Accordingly, it is an object of the present invention to provide an improved overhead stowage bin for use in an airplane passenger compartment.

It is another object of the present invention to provide an overhead stowage bin with power facilities to assist in opening and closing the bin when loaded.

It is a further object of the present invention to provide an overhead stowage bin which requires little or no manual lifting assistance.

It is yet another object of the present invention to provide an improved center overhead stowage facility for handling increased payloads which may permit elimination of side storage bins.

In accordance with the present invention, a powered stowage bin includes a member for holding items in movable relation to a support structure wherein a power unit provides a lifting force for lifting the holding member relative the support structure. In accordance with an aspect of the present invention, the powered stowage bin includes springs and snubbers for reducing the force required by the power unit for lifting the holding member and for assisting manual operation in the event of loss of the power unit.

In accordance with another aspect of the present invention, switches are disposed relative the holding member and the support structure for determining when and how a motor is to operate for lowering or lifting the holding member.

A further aspect of the present invention includes an overload regulator which determines when the load of the holding member exceeds a predetermined magnitude and thereupon disables the motor accordingly. After the load of the holding member is reduced below the predetermined value, the motor is re-enabled. Thus, the risk of damage from jamming or a minor accident event is reduced.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2 is a perspective view of an overhead stowage bin in accordance with one embodiment of the present invention;

FIG. 2A is a partial cross sectional view illustrating a chain storage cylinder;

FIG. 4 is an exploded partial perspective view of an overhead stowage bin illustrating operation of a latch and handle coupled thereto; and FIG. 5 is a cross sectional view of a latch in accordance with the present invention cooperating with a switch.

DETAILED DESCRIPTION

Figure 1:
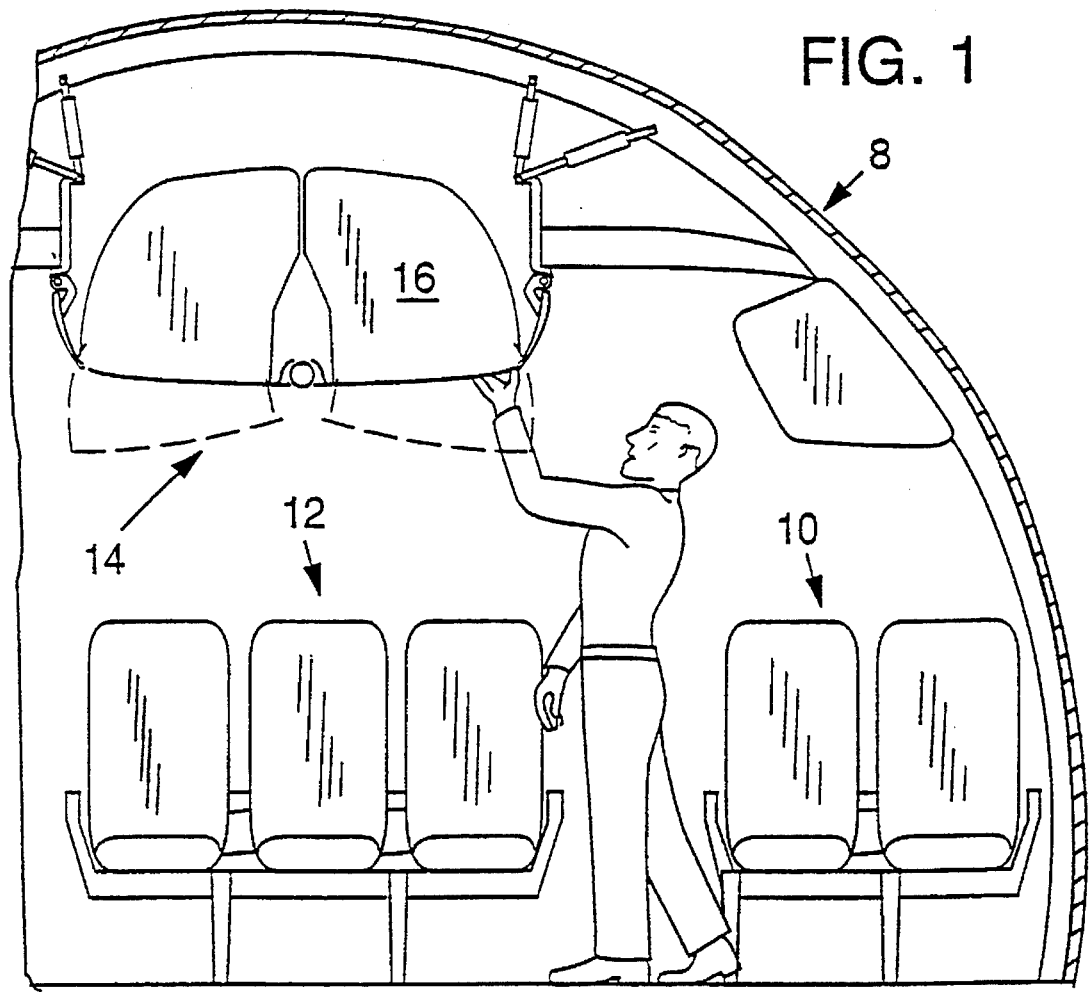
FIG. 1 is a cross sectional view of the interior of an airplane passenger compartment having center overhead stowage bins.
Figure 3A:
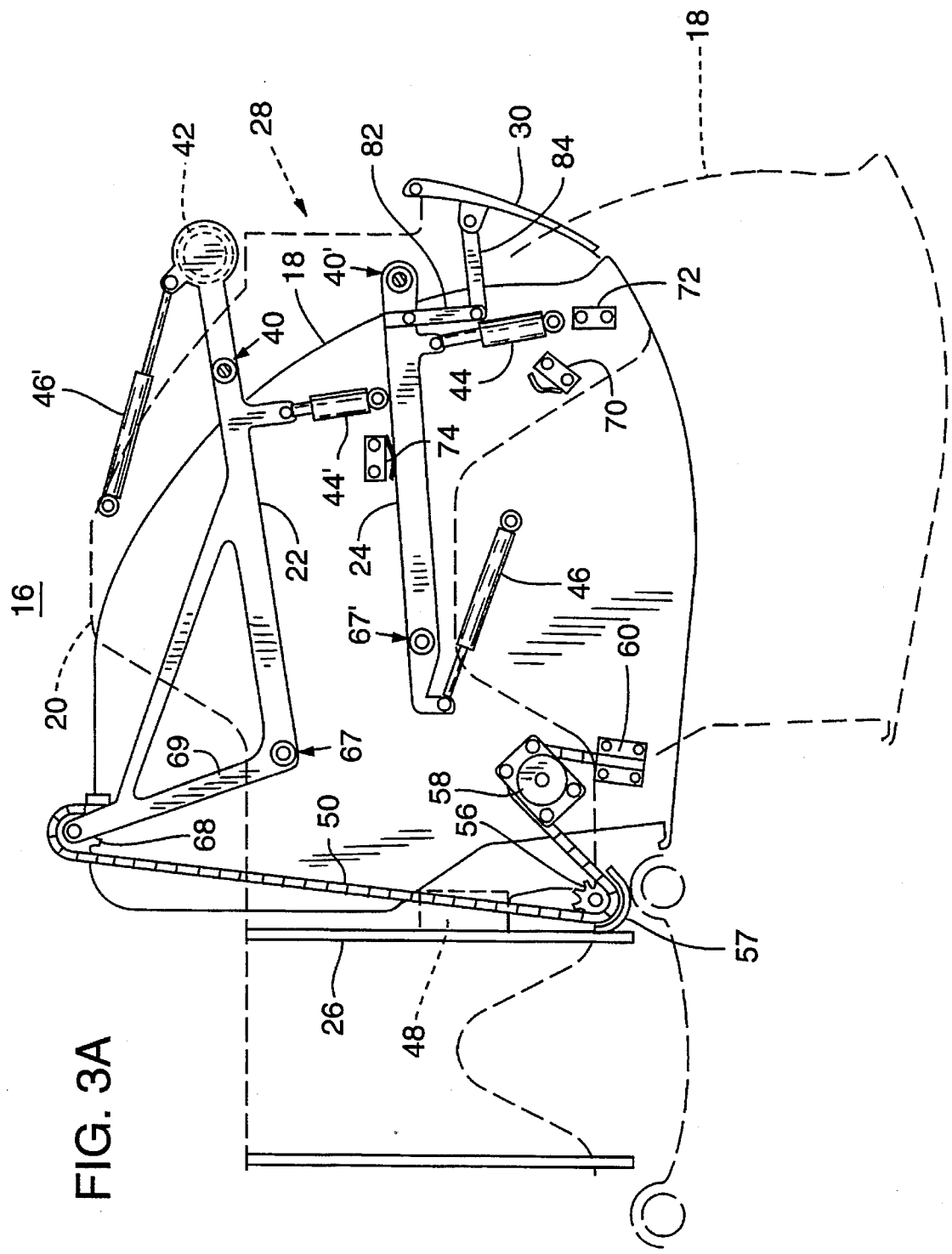
FIGS. 3A and 3B are partial cross sectional side views of an overhead stowage bin in accordance with a preferred embodiment of the present invention.

With reference to FIG. 1, the interior seats of a passenger airplane 8 are configured with rows 10 along sides of the airplane body and center rows 12 separated from the side rows by aisles running substantially the length of the airplane. Center overhead stowage bins 14 are located above the center row seats 12 for storing passenger belongings during flight. With reference to FIG. 2, an overhead stowage bin 16 of center overhead stowage bins 14 comprises a movable holding bin member 18 coupled to support structure 20. Support structure 20 primarily comprises a rectangular frame attached to the interior ceiling supports of the airplane over the center row seats 12 with the open bottom receiving the holding bin 18. Front wall 28 (as shown in FIG. 3A) of the support structure is a partial wall which extends from the interior ceiling down to about half the height of respective side walls. Linkage arms 22 and 24 support and guide the holding bin 18 along a predetermined path relative to support structure 20 as the bin moves up or down. Preferably, the center overhead storage bin 16 is a modular assembly which is preassembled before being located within the airplane 8.

The holding bin 18 essentially comprises an upright semi-rectangular box with a top forward portion removed and an upwardly extending partial front wall lip. The front lip prevents items from sliding out of the holding bin when the bin is in its open position with its bottom floor tilted.

Preferably, for taking advantage of its full height, the holding bin 18 includes a shelf (not shown) which divides the holding bin into upper and lower compartments. When the holding bin is in its retracted, closed position within the support structure, an opening remains at the front between the lip of the holding bin 18 and the partial wall 28 of the support structure 20. To cover this gap, an elongate hatch door 30, pivotally mounted to the lower edge of the partial front wall 28 of the support structure 20, pivots downwardly to abut the lip of the holding bin 18. Preferably, the front wall 28 of support structure 20, the pivoting hatch door 30, and the lip of the holding bin 18 have an esthetically pleasing rounded exterior providing an acceptable appearance to the interior of the passenger compartment.

With reference to FIGS. 4 and 5, respective latches 32 at opposite side walls of the holding bin 18 proximate the front lip engage respective posts 34 which protrude from the side walls of support structure 20 for securing the holding bin 18 in its retracted, closed position. Handle 36, located on the bottom outside face of the holding bin, is coupled to the latches by a coupling rod 38 so that when handle 36 is operated for opening and lowering the holding bin, latches 32 release the respective posts 34.

Figure 3B:
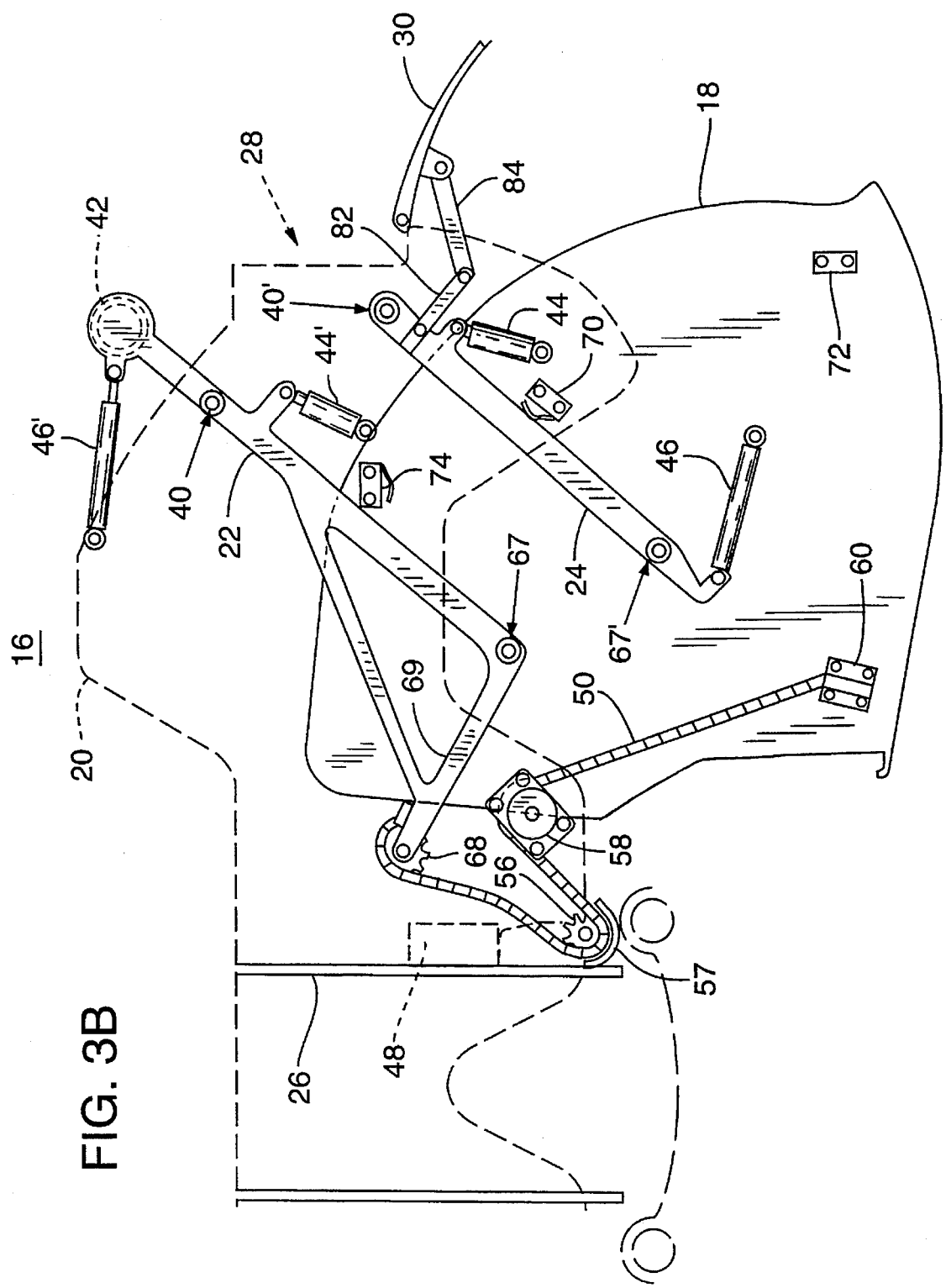

With reference to FIGS. 3A and 3B, at each end of the overhead stowage bin between the side walls of holding bin 18 and support structure 20, supporting linkage arms 22 and 24 are positioned one above the other with each arm having one end pivotally mounted to the support structure proximate the front of the holding bin at 40 and 40' and the other end pivotally mounted to the holding bin at locations 67 and 67' away from the front of the bin. The two linkage arms are positioned so that when the holding bin is in its closed position, as shown in full line in FIG. 3A, the arms are substantially horizontal and parallel to one another. The linkage arms are located and dimensioned such that as the holding bin is pivotally lowered from the position shown in full line in FIG. 3A to the position shown in full line in FIG. 3B, the holding bin tilts with its front dropping somewhat lower than its back. The tilted position permits easier access to the inside of the holding bin by a passenger or flight attendant.

Each upper linkage arm 22 has an extension beyond its pivotal attachment 40 to the support structure, and a torque tube or cylinder 42 (as shown in FIG. 2) is coupled between the distal ends of the extensions above the holding bin. The torque tube or cylinder 42 couples the upper linkage arms 22 to one another, keeping them at the same angular position whereby the holding bin 18 does not twist when loaded unequally at one side with respect to the other.

According to one embodiment of the present invention, with reference to FIG. 2, the lower linkage arm 24 at each end of the overhead stowage bin cooperates with a compression spring member 44 and snubber 46 pivotally connected to the support structure 20.

In accordance with a preferred embodiment, as illustrated in FIGS. 3A and 3B, the lower linkage arm 24 cooperates with a differently placed spring member 44 and snubber 46 while the upper linkage arm 22 cooperates with a spring member 44' pivotally coupled to the holding bin as well as a snubber 46'. Compressive spring member 44 is attached at its distal end to the support structure and exerts upward force on arm 24 between pivotal attachment points 67' and 40' and substantially closer to point 40'. Snubber 46 is disposed between the holding bin 18, below arm 24, and an outboard end of arm 24 beyond attachment point 67'. With snubber 46 fastened in the holding bin, instead of the support structure, it does not interfere with the linkage arms as the holding bin is moved relative the support structure. Compressive spring member 44' is attached at its distal end to the support structure and exerts upward force on arm 22 between pivotal attachment points 67 and 40 and substantially closer to point 40. Snubber 46' is disposed between the support structure 20, above arm 22, and the extension beyond pivotal attachment 40 where rod 42 is located. The spring members 44 and 44' provide "passive" forces for lifting the holding bin 18 relative the support structure 20 while the snubbers 46 and 46' dampen movement of the holding bin so as to limit its falling speed relative the support structure.

A feature of the present invention relates to motor 48 (as shown in FIG. 2) which drives two cable chains 50 for lifting the holding bin relative the support structure 20. Motor 48 is mounted on back wall 26 of the support structure (as shown in FIGS. 3A and 3B) in a vertical position with its motor shaft extending downwardly. A transfer box or gear box transfers, by 90°, the rotation of the motor's vertical shaft to that of horizontal shaft 54 (as shown in FIG. 2), horizontal shaft 54 extending the longitudinal length of the overhead stowage bin just beneath the back wall 26 of support structure 20. Drive sprockets 56 at opposite ends of the horizontal shaft rotate as the shaft is driven by the motor. Preferably, shaft 54 is a torque rod or cylinder which tightly couples the two drive sprockets 56 to one another so that they rotate in synchronization with substantially no differential rotation therebetween. With reference to FIG. 3A, pulleys 58 are mounted on each side wall of support structure 20 at a height above the respective rotating drive sprockets 56 and slightly outwardly thereof, proximate the rear of the support structure. Each of the two cable chains 50 wraps around a partial diameter of a respective drive sprocket 56 driven by horizontal shaft 54 and is kept on drive sprocket 56 by an associated chain keeper 57. Chain keeper 57 wraps around a partial circumference just beneath the respective drive sprocket 56 and keeps the associated cable chain 50 positively engaged with the drive sprocket 56 and guards against injury to an operator or maintenance personnel. The chain 50 passes from the drive sprocket 56 up and over pulley 58 and down to an attachment bracket 60 on an associated side wall of holding bin 18. In operation, when motor 48 rotates in a forward direction, horizontal shaft 54 and drive sprockets 56 rotate for pulling in cable chains 50, with pulleys 58 operatively redirecting the forces of the cable chains to the ends of holding bin 18 for lifting holding bin 18 relative to support structure 20.

In one embodiment of the present invention as illustrated in FIGS. 2 and 2A, two chain storage cylinders 62 are mounted to the rear wall 26 of support structure 20 just above respective drive sprockets 56. Each chain storage cylinder 62 is positioned with its cylindrical axis parallel to horizontal shaft 54 and has a lower opening in its cylindrical wall which receives the extra length of the respective cable chain 50 as driven by the associated drive sprocket 56. The chain storage cylinders 62 thus receive and store the excess portions of the respective cable chains 50 as motor 48 drives the cable chains, via the shaft and sprockets, for lifting the holding bin.

In the preferred embodiment of the present invention, as illustrated in FIGS. 3A and 3B, the upper linkage arm 22 at each end of the overhead stowage bin 16 includes a bell crank member 69 extending, perpendicular thereto from its pivotal attachment 67 to the holding bin 18, toward the top, rear corner of the holding bin with the holding bin in its closed position. The distal end of the bell crank member 69 carries a fixed sprocket 68. Instead of the loose ends of cable chains 50 being stored within chain storage cylinders 62, cable chains 50 pass up, over and wrap around a partial circumference of the respective fixed sprockets 68. Fixed sprocket 68 serves primarily as a means to positively engage cable chain 50 whereby the motor can aid in moving the bin downwardly. Thus, in the preferred configuration, each cable chain 50, from end to end, leaves sprocket 68 of the bell crank member 69, extends downwardly to wrap beneath and around a partial circumference of the associated drive sprocket 56 of horizontal shaft 54, wraps up and over the respective pulley 58 attached to support structure 20, and extends down from pulley 58 to the respective attachment bracket 60 secured to the holding bin 18. The placement and geometries of the components are such that cable chain 50 remains under tension and positively engaged with drive sprocket 56 as the holding bin 18 is moved between its upper, closed position and its lower, open position.

Bearing assemblies 66 with reference to FIG. 2, are disposed on the back wall 26 of the support structure 20 proximate the respective drive sprockets 56 and journal the respective ends of horizontal shaft 54. Preferably, the bearing assemblies 66 are maintenance-free Oilite or Garlock type needle bearing assemblies.

Switches, which are electrically coupled in circuit with motor 48 and its controller (not shown), are placed at locations on support structure 20 and holding bin 18 and function in accordance with the position of the holding bin relative the support structure for controlling operation of the motor. With reference to FIGS. 3A and 3B, an up-go/down-stop switch 70 is attached to support structure 20 just beneath the location of a lower linkage arm 24 when the holding bin is in its open position (see FIG. 3B). Switch 70 is operated by lower linkage arm 24 for turning off the motor when the holding bin reaches its lower, open position. If an operator subsequently moves the holding bin 18 for lifting the holding bin relative to support structure 20, the lower linkage arm 24 pivots and releases the up-go/down-stop switch 70, signaling the motor controller to toggle and operate the motor in a forward direction for raising the holding bin relative the support structure.

A down-go/up-stop switch 72 is positioned on holding bin 18 proximate one of the latches 32 (see FIGS. 4 and 5) and is operative for turning motor 48 off when the holding bin has reached its upper, closed position. This switch is further operative when handle 36 is operated, releasing latches 32 for turning the motor on and lowering the holding bin. When motor 48 is operating in a forward direction for lifting the holding bin 18 relative support structure 20, the holding bin eventually reaches its upper, closed position whereupon latches 32 engage respective posts 34 of the support structure for securing the holding bin thereto. The latch engagement operates the down-go/up-stop switch 72, signaling the motor to stop, and subsequently, when handle 36 is operated for disengaging latches 32 of the holding bin from posts 34 of the support structure, the down-go/up-stop switch 72 is activated for toggling the motor via the controller to turn on in a reverse direction for lowering the holding bin relative support structure 20.

In accordance with an embodiment of the present invention, a proximity sensor 74 (as shown depressed in FIG. 3A) attached to the support structure determines the position of the holding bin relative the support structure. The proximity sensor is electrically coupled to a motor controller for controlling the operational speed of the motor in response to placement of the holding bin relative to the support structure. For example, when the motor is operating in a forward direction for lifting the holding bin and the proximity sensor determines the holding bin is close to its closed position, the sensor signals the motor to reduce its operational speed so that the holding bin is not jarred excessively upon reaching its closed position as shown in solid line in FIG. 3A.

Not illustrated specifically are mechanical stopper blocks which are located at each end of the overhead stowage bin. A first stopper block, which may consist of the mechanical housing of proximity sensor 74, is secured to support structure 20 at a location proximate the top and middle of holding bin 18 with the holding bin in its open position as in FIG. 3A. A second engagement stopper block, or bracket, is secured to the holding bin 18 for engaging the first stopper block when the holding bin has reached its lower, open position. Such two blocks function to stop further downward movement of the holding bin 18 relative the support structure 20 and to relieve tension in the cable chain 50 once the holding bin 18 reaches its lower, open position.

In accordance with another aspect of the present invention, up, stop and down control switches 90 may be conveniently provided on the outside surface of the overhead stowage bin as shown in FIG. 4 or elsewhere for operation by a passenger or flight attendant for selecting motor operation and/or terminating stowage bin activity for passenger safety during takeoffs and landings. An up control switch, when depressed by the passenger or flight attendant, signals motor 48 to operate in a forward direction for lifting the holding bin 18 relative support structure 20. Operating a stop control switch signals motor 48 to stop. Activating the down control switch signals motor 48 to operate in a reverse direction for lowering the holding bin 18 relative the support structure. A master enable/disable switch, conveniently located at a position, not shown, in the passenger compartment of the airplane, is operated by a flight attendant for disabling operation of all overhead stowage bins during takeoffs and landings.

According to another aspect of the present invention, the springs 44 and 44' are not provided with the overhead stowage bin, wherein the lifting forces are provided by the motor in combination with manual efforts, if any, exerted by a passenger or flight attendant.

To protect the motor from burnout, an overload detector desirably interrupts the motor when the load of the holding bin exceeds a predetermined magnitude. The overload detector in one form comprises a circuit breaker disposed in the serial path by which motor 48 receives electrical power, which circuit breaker interrupts power delivery when the motor's power demand exceeds a threshold level. In another form, the overload detector comprises a tension sensor which determines when the tension in the cable chain exceeds a threshold value and disables the motor accordingly. Alternatively, the tension sensor determines the tension in the cable, which corresponds to the load of the holding bin, and adjusts the driving forces applied by the motor in accordance with the determined load of the holding bin for regulating the velocity of the holding bin relative the support structure. For example, heavier loads will demand greater driving forces from the motor whereas lighter loads, or an empty bin, will employ minimal driving forces from the motor.

According to one aspect of the present invention, the motor, after having been interrupted, is automatically re-enabled after the passage of a predetermined period of time. In accordance with another aspect of the present invention, a reset switch is provided on the outside surface of the overhead stowage bin so that once motor 48 has been interrupted, a passenger or flight attendant can operate the reset switch for re-enabling the motor. Alternatively, if the overload detector comprises a cable chain tension sensor, the motor is re-enabled once the sensor determines that the tension in the cable chain has fallen below the threshold tension.

In a preferred embodiment of the present invention, motor 48 provides about 70 percent of the lifting forces while passive springs 44 and 44' and/or the passenger or flight attendant strength provide the remaining lifting forces. However, it will be apparent to one skilled in the art that any ratio of power versus passive and/or manual lifting forces can be employed.

For the preferred embodiment of the present invention, with reference to FIG. 3B, passive spring member 44' of the upper linkage arm 22 cooperates with the linkage arm to provide an over-center locking function by applying torque to the linkage arm for keeping the holding bin in its open position when the holding bin has been lowered beyond an over-center position. This over-center locking operation is provided in accordance with the orientation of the center axis of spring member 44' with respect to pivot axis 40 where the upper linkage arm 22 is pivotally mounted to the support structure. With reference to FIG. 3A, when holding bin 18 is in its closed position, spring member 44' applies a force along its longitudinal axis to the linkage arm, with such longitudinal axis to one side of pivot axis 40, and provides a torque to linkage arm 22 for lifting the holding bin. In contrast, with reference to FIG. 3B, when holding bin 18 has been lowered to its open position, the orientation of the longitudinal axis of spring member 44' has moved to the opposite side of pivot axis 40 so as to provide a small locking torque for keeping the holding bin locked in its lower, open position. Alternatively, when the holding bin 18 is in its lower, open position, the orientation of the longitudinal axis of the passive spring 44' is provided in alignment with the pivot axis 40 of the linkage arm and the force of passive spring 44' becomes ineffective, with no movement arm, so that the weight of the holding bin is sufficient to hold it in its lower, open position. Therefore, once the holding bin has been unloaded in its open position, it does not creep back up on its own accord; rather, the holding bin remains locked in its open position until receiving another force overcoming the small locking torque of spring 44' or the bin weight. The geometry of the linkage arms of the overhead stowage bin design provides an open position for the holding bin 18 wherein the holding bin is easily swung in a primarily horizontal direction for overcoming the small locking torque and/or operating the appropriate switch, as described hereinbefore, for signaling the motor to lift the holding bin 18.

Elongate hatch door 30 (as shown in FIGS. 3A and 3B) is operated at each end of the overhead stowage bin by a secondary bell crank arm 82 of a lower linkage arm 24 and a coupling rod 84. The secondary bell crank arm 82 of each lower linkage arm 24 extends downwardly from and primarily perpendicular to the linkage arm proximate its pivotal attachment to the support structure 20 at 40'. Coupling rod 84 is disposed between hatch door 30 and the distal end of the respective secondary bell crank arm 82. When the lower linkage arm 24 pivots, as the holding bin is lowered into its open position, the secondary bell crank arm 84 moves coupling rod 84 outwardly, in turn forcing hatch door 30 to an open position.

In the preferred embodiment, each cable chain 50 is a "BERG" chain constructed of high-strength, low-maintenance, synthetic plastic with multistrand steel cables inside. However, it will be apparent to one skilled in the art that the sprockets and cable chains could be replaced with other appropriate engagement pulleys and cables for similar operation.

It is apparent, that in some instances of motor operation, the motor does not expend any power as the holding bin moves. For example, when the weight of a loaded holding bin is greater than the passive spring forces, the loaded holding bin will fall on its own accord with no assistance from the motor in overcoming the passive spring forces. Under these conditions, the motor does not expend any power for moving the bin down; rather, the motor acts as a passive geared resisting device for slowing the speed of the holding bin as it falls downwardly.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A powered stowage bin for storing items comprising:
   a support structure;
   a holding member movably related to the support structure for receiving and holding items relative the support structure;
   power means for providing a lifting force; and
   coupling means for coupling the lifting force from the power means to the holding member so as to move the holding member relative the support structure;
   wherein the power means includes a motor driving a shaft coupled to a sprocket for operatively driving said coupling means; and
   wherein the coupling means includes a cable chain having a length thereof wrapped around a partial circumference of said sprocket and a length thereof disposed above at least a portion of said holding member in upwardly lifting and supporting relation to said holding member.

2. A powered stowage bin according to claim 1 wherein the holding member operates between first and second positions relative the support structure, said powered stowage bin further comprising first means selectively operative for enabling the power means to move said holding member from its first position to its second position, and second means operative for sensing when the holding member reaches said second position from said first position and accordingly turning off the power means.

3. A powered stowage bin according to claim 2 further comprising latching means operative between the support structure and the holding member for securing the holding member in said second position when said power means is turned off.

4. A powered stowage bin for storing items comprising:

a support structure;

a holding member movably related to the support structure for receiving and holding items relative the support structure;

power means for providing a lifting force;

coupling means for coupling the lifting force from the power means to the holding member so as to move the holding member relative the support structure; and a linkage member having a primary arm with first and second ends pivotally mounted to the support structure and the holding member respectively for movably supporting said holding member, said linkage member having a bell crank arm coupled to said primary arm proximate said second end, wherein the power means includes a motor driving a shaft coupled to a sprocket operatively driving said coupling means, and the coupling means includes a cable chain having one end coupled to an end of the bell crank arm of said linkage member, the other end being secured to the holding member, and a length thereof being wrapped around a partial circumference of said sprocket.

5. A powered stowage bin for storing items comprising:

a support structure;

a holding member movably related to the support structure for receiving and holding items relative the support structure;

power means for providing a lifting force; and coupling means for coupling the lifting force from the power means to the holding member so as to move the holding member relative the support structure;

wherein the power means includes a gear motor driving a shaft having a drive sprocket at each end, and said coupling means comprises a pair of cable chains, wherein each cable chain wraps around and engages the respective drive sprocket of the shaft and attaches to the holding member, and the gear motor drives the cable chain via the shaft and drive sprockets for lifting the movable holding member with left and right balanced synchronized operation.

6. A powered stowage bin according to claim 5 wherein the gear motor is secured to the support structure which further comprises a pair of pulleys, each pulley being disposed on the support structure substantially above respective cable chain attachments to the holding member, and wherein each one of the cable chains passes from the associated drive sprocket over the respective pulley and down to its attachment to the holding member so that tension in the cable chains provides an appropriate upward force acting upon the holding member.

7. A powered stowage bin according to claim 5 wherein the shaft is a torque rod for keeping the drive sprockets tightly coupled with limited relative rotation therebetween.

8. A powered stowage bin according to claim 5 further comprising a pair of chain storage members attached to the support structure proximate respective drive sprockets for receiving an end of the associated cable chain distant the holding member and for storing excess length thereof as the gear motor drives the shaft, drive sprockets and cable chains for lifting the holding member.

9. A powered stowage bin for storing items comprising:

a support structure;

a holding member movably related to the support structure for receiving and holding items relative the support structure;

power means for providing a lifting force;

coupling means for coupling the lifting force from the power means to the holding member so as to move the holding member relative the support structure; and linkage arms effective between the support structure and the holding member for movably supporting and guiding the holding member along a predetermined path relative the support structure as the power means is selectively operated in one operating mode for lowering the holding member with respect to the support structure via the coupling means, and in a second operating mode for lifting the holding member with respect to the support structure via the coupling means;

wherein the linkage arms include two sets of first and second linkage arms having first ends pivotally secured to the support structure and second ends pivotally secured to the holding member, said first and said second linkage arms each being disposed in substantially horizontal positions one above the other when the holding member is in its secured operating position and are disposed away from the horizontal positions with second ends lower than respective first ends when the holding member has been lowered to its open operating position;

wherein the holding member has first and second sides with a set of said first and second linkage arms being provided proximate each side of the holding member; and wherein one of said linkage arms of each set has an extension beyond its pivotal mounting to the support structure, said powered stowage bin further comprising a torque tube coupled between distal ends of said extensions for intercoupling a rotation at respective sides of the holding member so that the holding member remains mechanically balanced with substantially no twisting.

10. A powered stowage bin for storing items comprising:

a support structure;

a holding member movably related to the support structure for receiving and holding items relative the support structure;

power means for providing a lifting force;

coupling means for coupling the lifting force from the power means to the holding member so as to move the holding member relative the support structure; and snubbing means for dampening downward movement of the holding member with respect to the structural support.

11. A powered stowage bin according to claim 10 further comprising linkage arms effective between the support structure and the holding member for movably supporting and guiding the holding member along a predetermined path relative the support structure as the power means is effectively operated in one operating mode for lowering the holding member with respect to the support structure via the coupling means, and in a second operating mode for lifting the holding member with respect to the support structure via the coupling means;

wherein the snubbing means is coupled between one of said linkage arms and the holding member.

12. A powered stowage bin for storing items comprising:

a support structure;

a holding member movably related to the support structure for receiving and holding items relative the support structure;

power means for providing a lifting force;

coupling means for coupling the lifting force from the power means to the holding member so as to move the holding member relative the support structure; and spring means for providing a passive lifting force to the holding member with respect to the support structure.

13. A powered stowage bin according to claim 12 wherein the spring means provides a passive lifting force of a magnitude less than that required for lifting the holding member so that an additional force acting with said passive lifting force is required for lifting the holding member relative the support structure.

14. A powered stowage bin for storing items comprising:

a support structure;

a holding member movably related to the support structure for receiving and holding items relative the support structure;

power means for providing a lifting force; and coupling means for coupling the lifting force from the power means to the holding member so as to move the holding member relative the support structure;

linkage arms effective between the support structure and the holding member for movably supporting and guiding the holding member along a predetermined path relative the support structure as the power means is selectively operated in one operating mode for lowering the holding member with respect to the support structure via the coupling means, and in a second operating mode for lifting the holding member with respect to the support structure via the coupling means; and spring means for providing a passive lifting force to the holding member with respect to the support structure;

wherein the linkage arms each comprises a lever having first and second ends pivotally mounted to the support structure and holding member respectively, and said spring means comprises a spring pivotally coupled between the support structure and said lever to provide a spring force acting along a spring alignment axis, wherein an orientation of the alignment axis pivots relative the support structure as the holding member moves relative the support structure, and a direction of torque provided by the spring force of said spring acting upon said lever along the alignment axis relative the first end pivotally mounted to the support structure changes as orientation of the alignment axis pivots in and out of alignment with a pivot axis of said pivotal mounting of the lever to the support structure for providing an over-center operational effect as the holding member is moved to its closed operating position.

15. A powered stowage bin for storing items comprising:

a support structure;

a holding member movably related to the support structure for receiving and holding items relative the support structure;

power means for providing a lifting force; and coupling means for coupling the lifting force from the power means to the holding member so as to move the holding member relative the support structure; and wherein the holding member operates between first and second positions relative the support structure, said powered stowage bin further comprising first means selectively operative for enabling the power means to move said holding member from its first position to its second position, second means operative for sensing when the holding member reaches said second position from said first position and accordingly turning off the power means, and third means disposed relative the support structure and the holding member for sensing when the holding member reaches a third position between said first and second positions and accordingly adjusting a driving force of the power means for controlling velocity of the holding member relative the support structure.

16. A powered stowage bin for storing items comprising:

a support structure;

a holding member movably related to the support structure for receiving and holding items relative the support structure;

power means for providing a lifting force;

coupling means for coupling the lifting force from the power means to the holding member so as to move the holding member relative the support structure; and means for determining when a load of the holding member exceeds a predetermined overload magnitude and disabling the power means accordingly, and re-enabling the power means after the load has been reduced below a predetermined overload magnitude.

* * * * *